Figure 1:
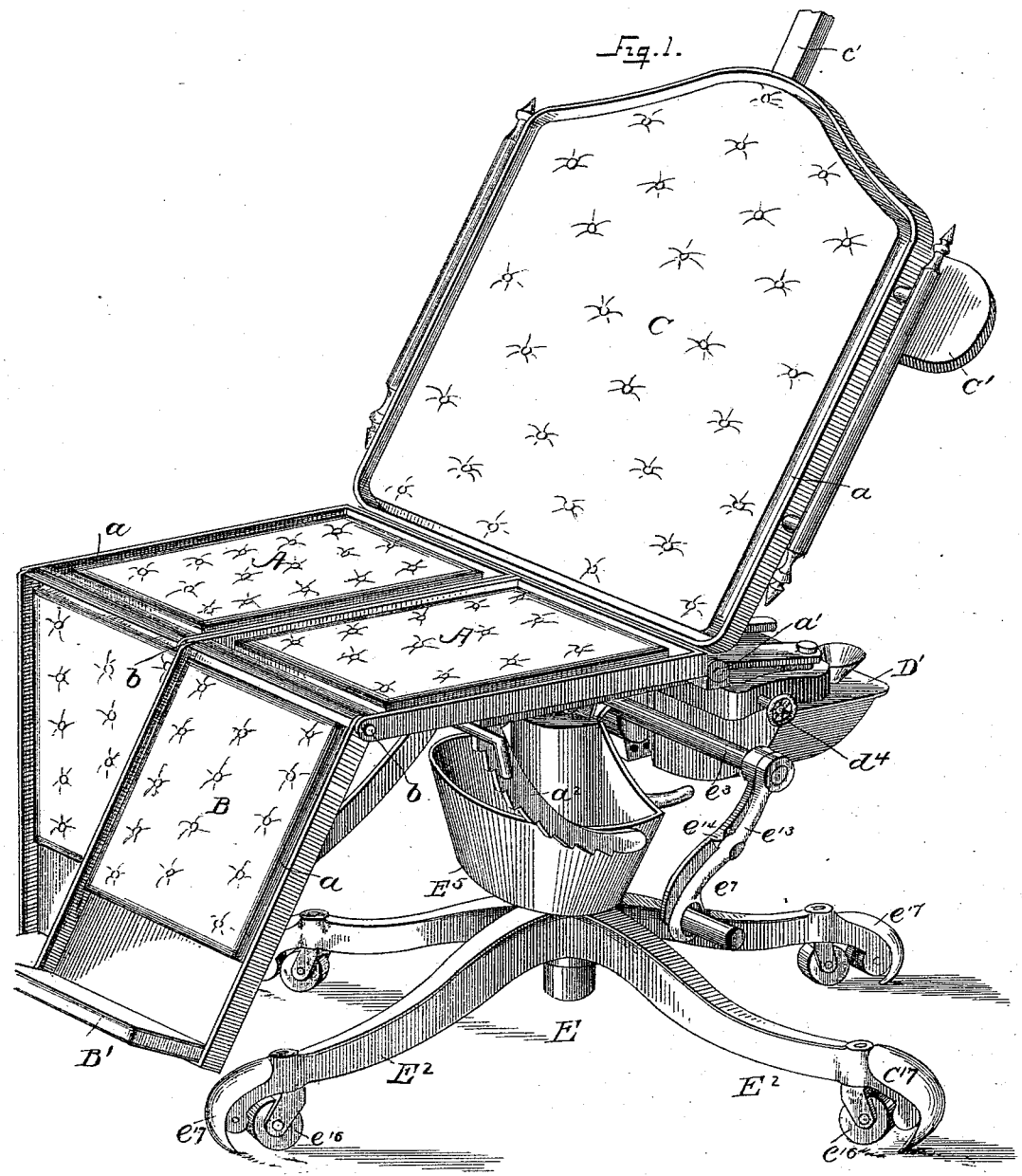

(No Model.) 7 Sheets—Sheet 2.

H. R. ALLEN.
OPERATING CHAIR.

No. 439,088. Patented Oct. 28, 1890.

Witnesses:

Inventor:
Horace R. Allen,
by
R. S. Dyrenforth.
his Attorney.

(No Model.) 7 Sheets—Sheet 3.

H. R. ALLEN.
OPERATING CHAIR.

No. 439,088. Patented Oct. 28, 1890.

(No Model.)  7 Sheets—Sheet 4.

H. R. ALLEN.
OPERATING CHAIR.

No. 439,088. Patented Oct. 28, 1890.

Witnesses:

Inventor:
Horace R. Allen, his Attorney.

(No Model.) 7 Sheets—Sheet 5.
H. R. ALLEN.
OPERATING CHAIR.
No. 439,088. Patented Oct. 28, 1890.
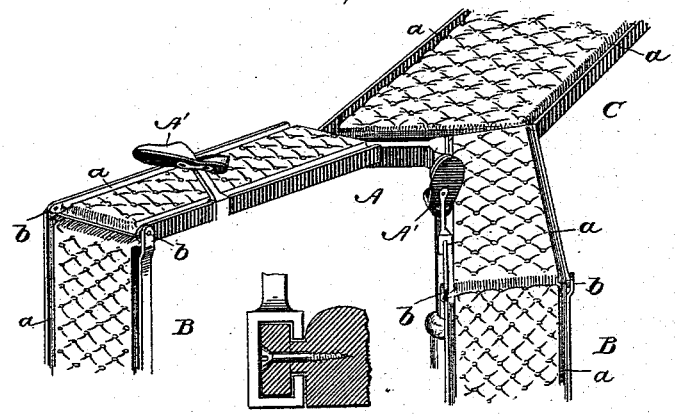
Fig. 7.
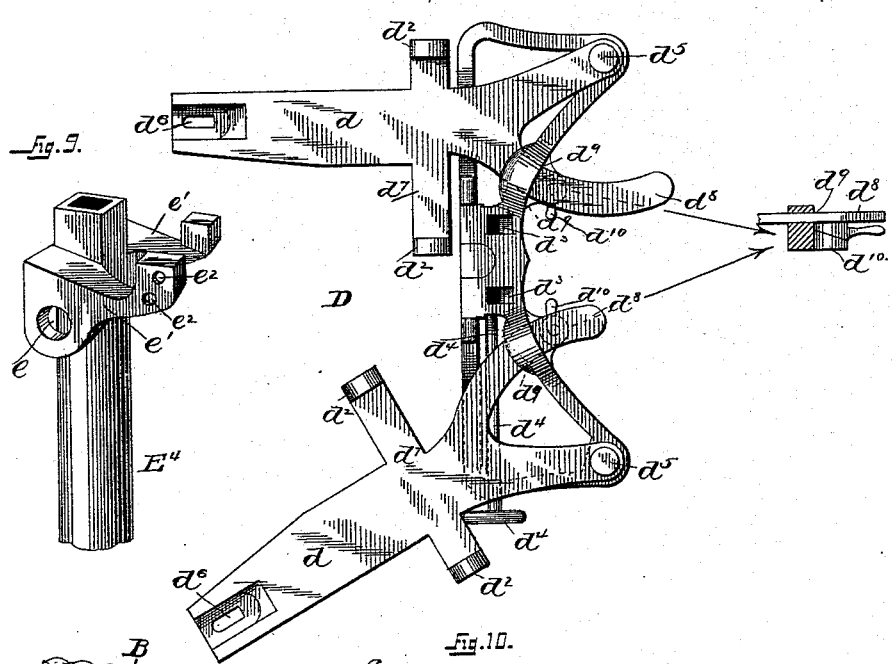
Fig. 8.
Fig. 9.
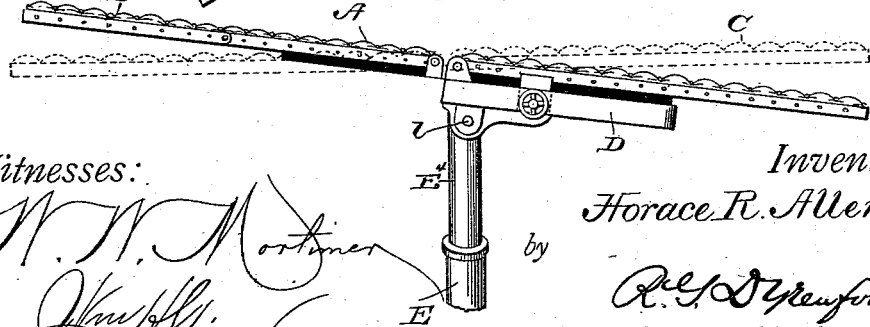
Fig. 10.
Witnesses:
W. W. Mortimer
Inventor:
Horace R. Allen,
by
R. S. Dyrenforth.
his Attorney.

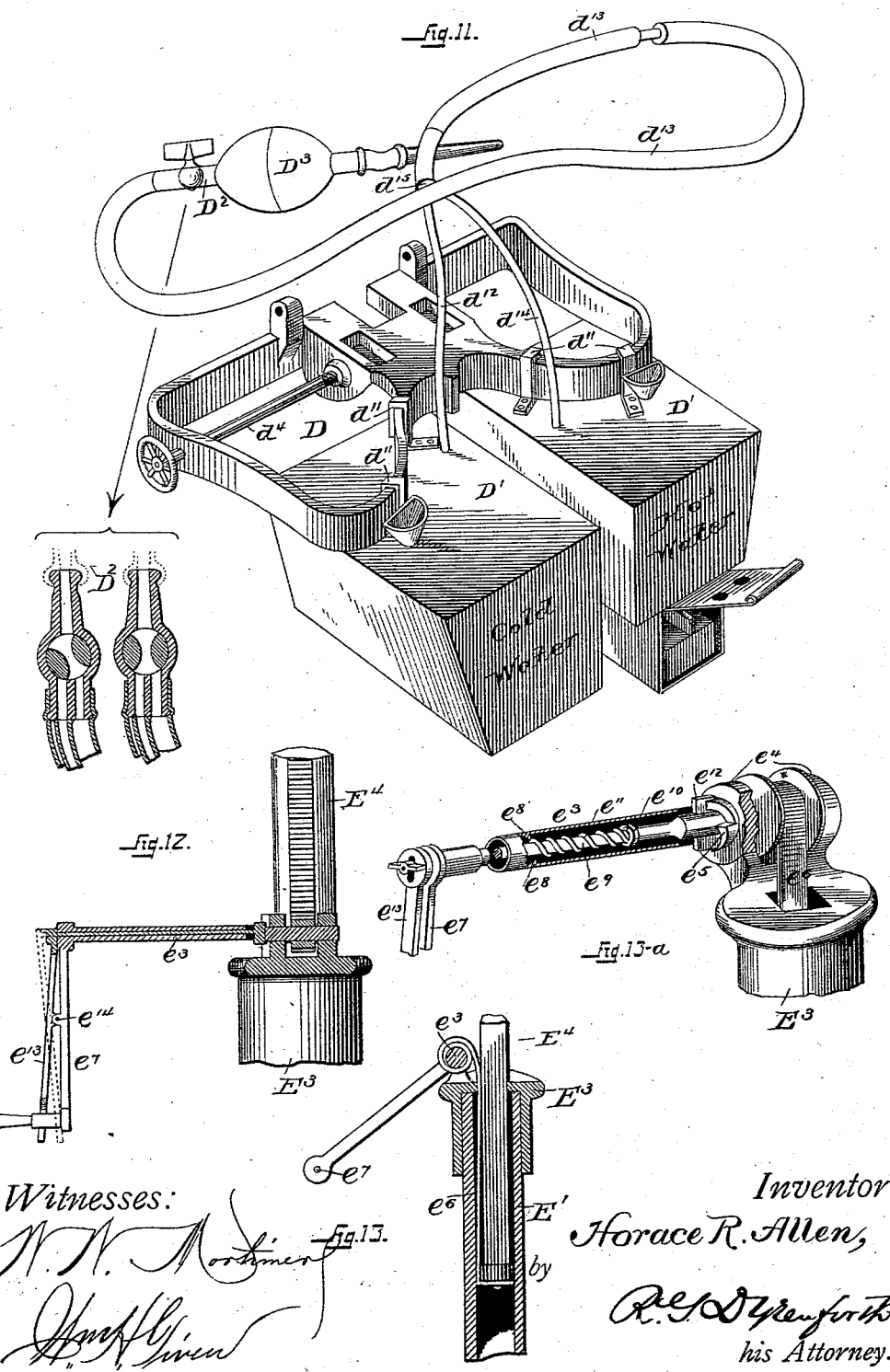

(No Model.) 7 Sheets—Sheet 7.
H. R. ALLEN.
OPERATING CHAIR.
No. 439,088. Patented Oct. 28, 1890.
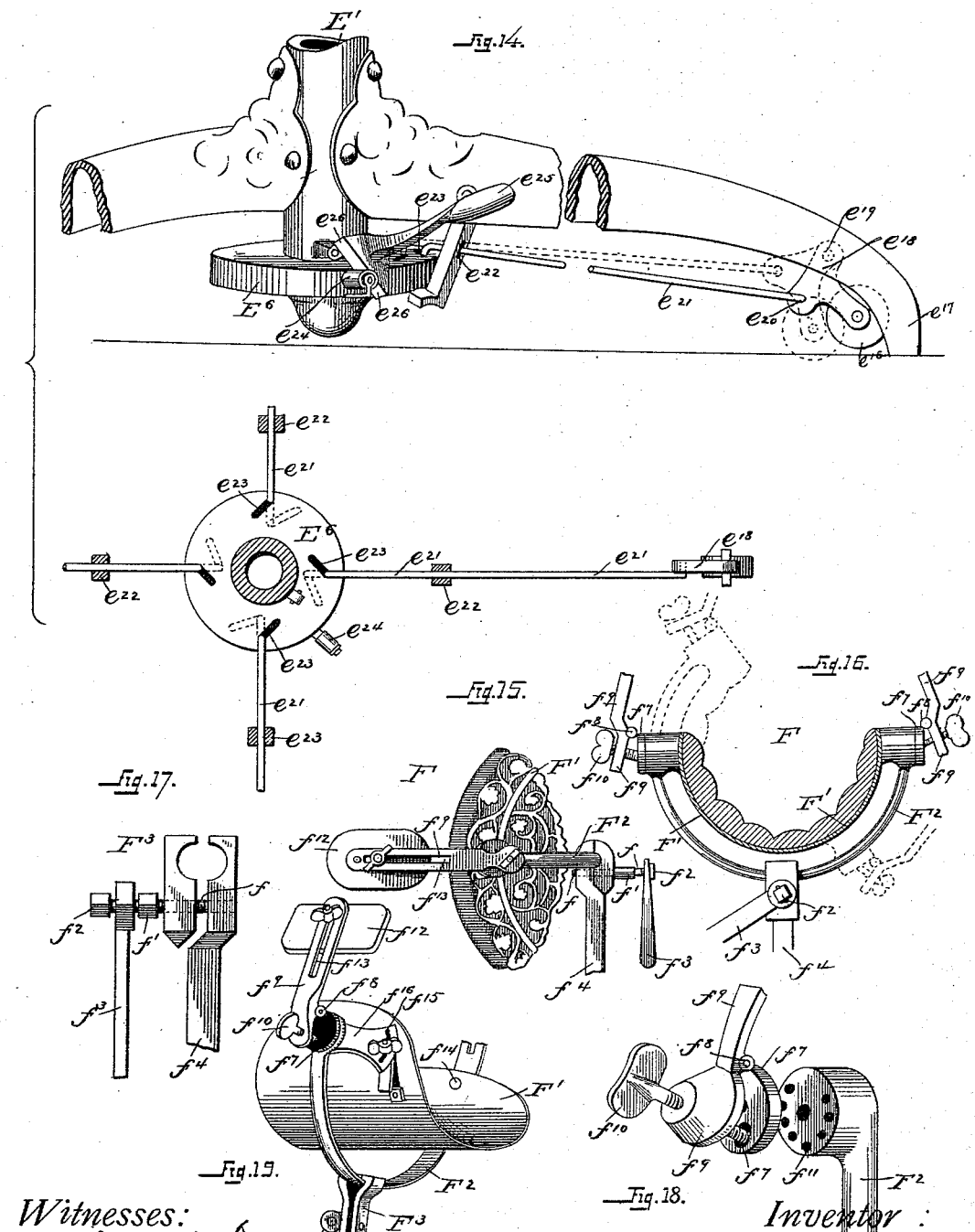
Witnesses:
Inventor:
Horace R. Allen,
by R. S. Dyrenforth
his Attorney.

UNITED STATES PATENT OFFICE.

HORACE R. ALLEN, OF INDIANAPOLIS, INDIANA.

OPERATING-CHAIR.

SPECIFICATION forming part of Letters Patent No. 439,088, dated October 28, 1890.

Application filed October 9, 1885. Renewed March 27, 1890. Serial No. 345,492. (No model.)

*To all whom it may concern:*

Be it known that I, HORACE R. ALLEN, a citizen of the United States, residing at Indianapolis, in the county of Marion and State of Indiana, have invented certain new and useful Improvements in Operating-Chairs; and I do hereby declare the following to be a full, clear, and exact description of the invention, such as will enable others skilled in the art to which it appertains to make and use the same.

This invention relates to adjustable chairs for the use of surgeons, dentists, oculists, and generally those having operations to perform upon the human body.

The objects of the invention are to produce a chair which shall meet every requirement of aid and convenience to the operator and safety and comfort to the patient; to produce a chair in which a patient may be sustained in any position most suitable and best adapted to the operation to be performed; to produce a chair which will give support to all parts of the body in any position in which the body may be placed; to produce a chair in which a patient may be secured as firmly as possible, thus to facilitate operation and obviate danger from accident; to produce a chair which can readily and instantly be shifted from one position to another, whether a person be sitting or reclining on the same or not; to produce a chair the parts of which shall be compact and firm in all positions while it will at the same time not be too heavy or be cumbersome, and, finally, to produce a chair which with every facility for ready adjustment and for aid to the operator, being capable of elevation and depression and change from a position affording rest while sitting or from a seat to a position affording rest while reclining—that is, to a couch, bed, stretcher, or operating-table—being capable of rotation upon its axis, being capable of flexure in some of its parts to insure requisite flexure of the limbs of the patient, being capable of extension or separation in some of its parts to insure requisite extension of the limbs of the patient with adequate support, being capable of permitting firm attachment of a patient, being capable of affording a complete and clean operating-stand, and of being easily moved from one place to another, though capable of instant fixture, shall be of comparatively uncomplicated construction, and shall be of neat and attractive appearance.

With these objects in view the invention consists in certain constructions, all as hereinafter more particularly pointed out and claimed.

Figure 2:
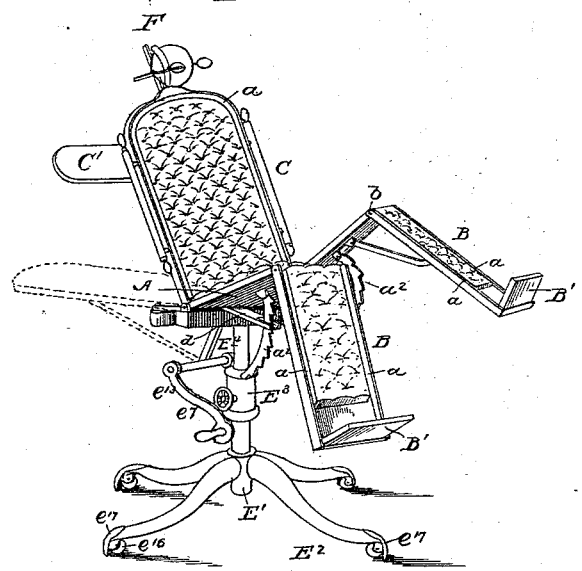
Figure 3:
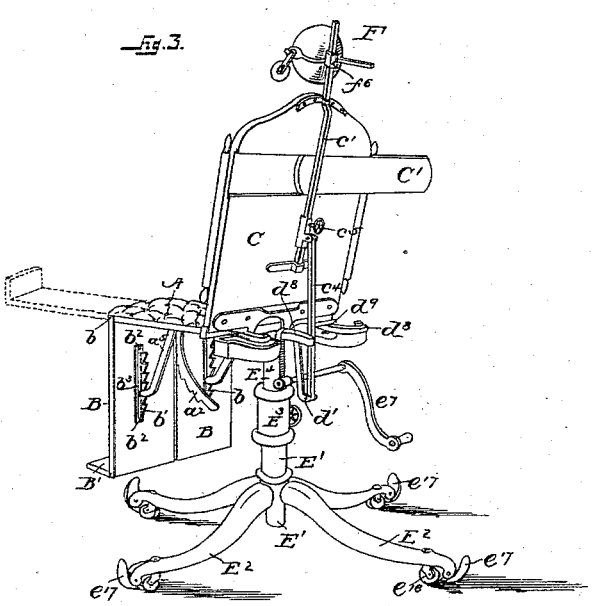
Figure 4:
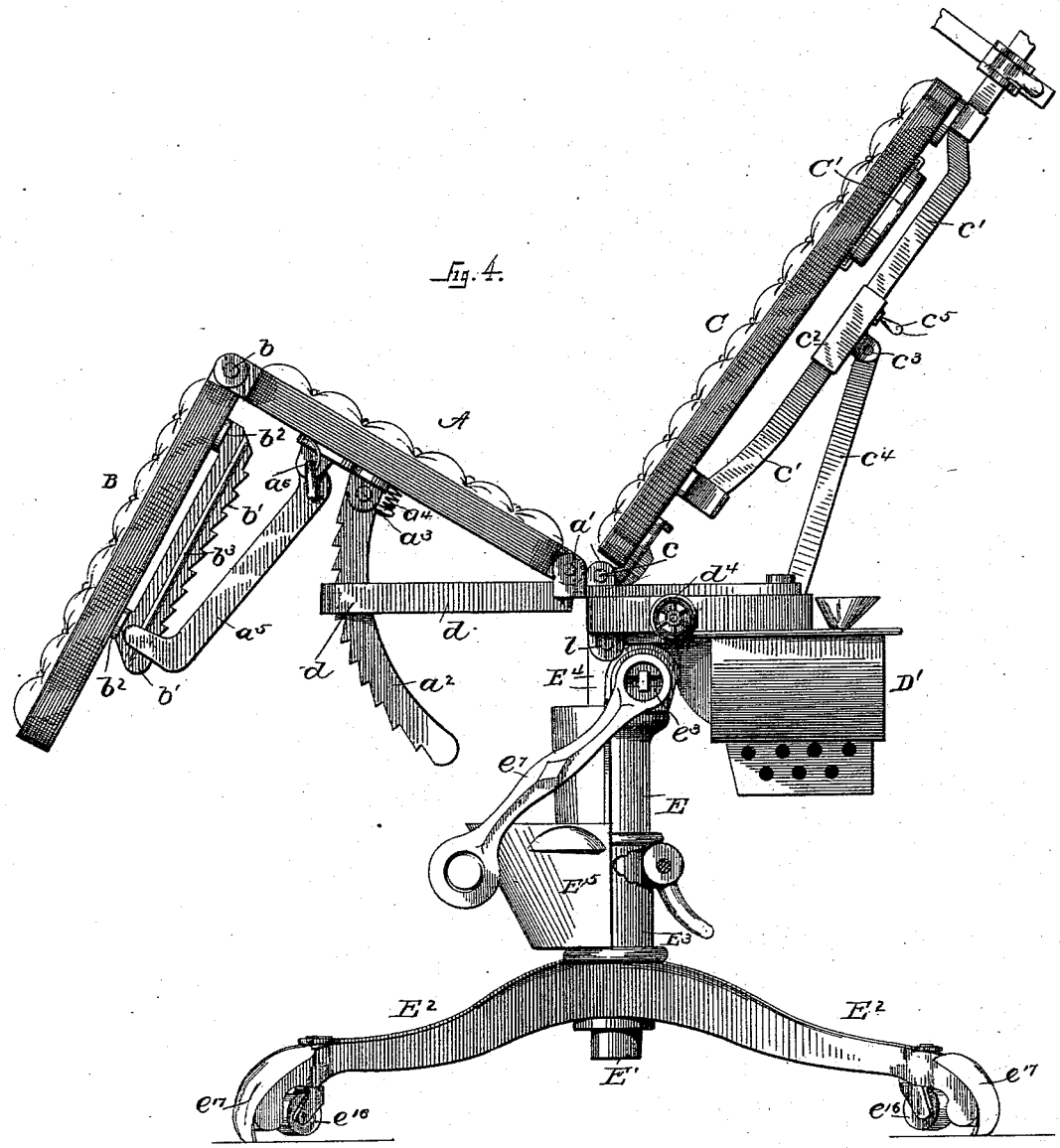
Figure 5:
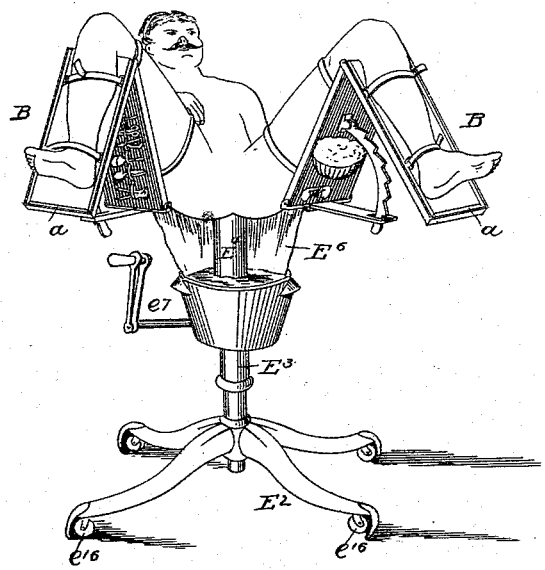
Figure 6:
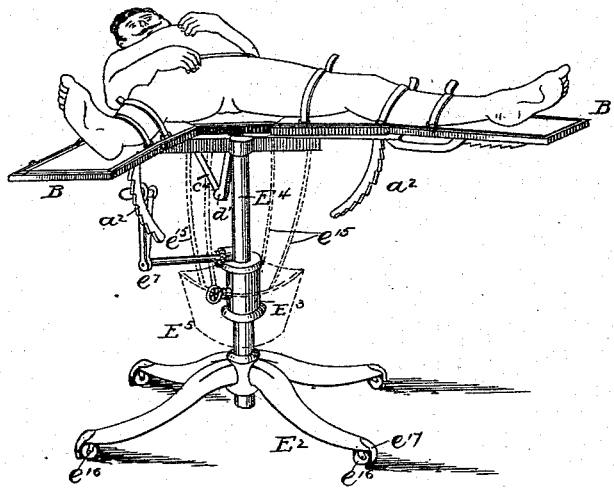

In the accompanying drawings, forming part of this specification, and in which like letters of reference indicate corresponding parts, Figure 1 is a perspective view of a chair embodying my invention, showing the divided seat and leg portions, the pivoted back, the arm-rest partly extended from the back, the receptacle upon the support, a receptacle for hot or cold water, the legs, and one means of permitting the chair to rest either upon feet or upon rollers. Fig. 2 is a further perspective view, with the hot and cold water receptacles removed, showing the means for vertically extending and sustaining, when so extended, the seat and leg portions of the chair, showing also in dotted lines the back extended, showing also the standard, the sleeve, and hollow column, the drain-pipes from the gutters, the arm-rest extended, and the head-rest in position. Fig. 3 is a further perspective view showing the back of the chair, with means for sustaining it in any desired position, as well as means for raising and lowering the chair. Fig. 4 is a side elevation of the chair, particularly displaying the means for sustaining the seat, leg, and back portions, and showing the stop to restrain rotation of the sleeve. Fig. 5 is a front perspective view showing the chair with the seat and leg portions spread asunder and the apron in position, an individual being shown strapped in the chair to illustrate the operation. Fig. 6 is a further front perspective view showing still another position of the chair with an individual strapped thereon to illustrate the operation, and showing in dotted lines drain-tubes from the gutters. Fig. 7 is a perspective view of a portion of the chair with the lower part of a foot-rest in detail and a side rail in section, showing the vertically-movable and laterally-extensible leg portion with adjustable foot-rests. Fig. 8 is a plan view of the frame for sustaining and holding the seat and back portions of the chair, as well as for sustaining the hot and cold water receptacles. Fig. 9 is an elevation of the standard, showing the eyes in which the frame is pivoted to enable tilting of the back and seat. Fig. 10 is a side elevation of the back, seat, and leg portions of the chair and standard, showing the back, seat, and leg portion extended to form a table, and tilted. Fig. 11 is a perspective view of the frame with hot and cold water receptacles attached, showing means for utilizing the water and displaying some parts in detail. Fig. 12 is a view in elevation and partly in section showing means for raising and lowering the standard. Fig. 13 is a sectional view of a modification thereof. Fig. 13$^a$ is a perspective view of a modification with a portion broken away to show a spring for pushing parts into gear. Fig. 14 is a perspective view showing means for setting the chair upon rollers or upon feet, the parts being displayed in detail in plan view. Fig. 15 is a perspective view of the head-rest, showing the wrench and clamp and also the side pieces. Fig. 16 is an end view of the head-rest or head-support, with the pad and frame in vertical section. Fig. 17 is a side view of the clamp for holding the head-rest. Fig. 18 is a detail view of the side pieces of the head-rest, showing the means for moving their ends inward against the head and holding them there. Fig. 19 is a perspective view showing a modification of the head-rest and clamp.

The operating-chair may be divided into six general parts—a seat portion, a leg portion, a back, a supporting-frame, a pedestal, and a head-rest.

The seat portion is marked A, the leg portion B, the back C, the supporting-frame D, the pedestal E, and the head-rest F.

The seat portion A is split, forming two parts or a split seat, each part separately and independently movable both vertically and laterally, each part capable of fixture at any point in its vertical or lateral movement, and each part, if desired, provided with gutters to collect and carry off any liquid employed in or fluent matter resulting from a surgical operation. These gutters are marked $a$. The parts of the seat portion are pivoted to the supporting-frame D at $a'$, and have under them each a movable depending curved rack $a^2$, pivoted to its part of the seat portion at $a^3$, held extended by a spring $a^4$, and catching upon or taken into by the edge of a slot in an arm $d$ of the supporting-frame D. Upon an inner side rail of each or either part of the seat portion may be a foot-support A'. This support is of any suitable firm material, and is constructed with a sandal and a shank, the shank having at its lower end a socket open at one side, whereby it may be slipped over the inner end of a side rail and slide upon such rail—that is to say, when the upper margin of a socket bears evenly or uniformly upon its rail, the support may readily be slipped from end to end of the rail; but when pressure is applied upon or against the sandal the leverage of the shank will cause the socket to bind against or clamp the rail, and so fix the support wherever desired. The purpose of the support is to flex and hold flexed a leg or legs from a foot or the feet in examinations of the uterus and other pelvic organs. The seat portion may be provided underneath on one side with retaining or holding devices for instruments or utensils and on the other with similar devices for sponges, lint, or anything else desired.

The leg portion B is likewise split, forming two parts, each part separately movable and independently movable vertically, but movable laterally only when its corresponding part of the seat portion is moved, each part capable of fixture at any point in its vertical movement, and each part, if desired, provided with gutters for the same purpose as the gutters of the seat portion. The parts of the leg portion are pivoted to the seat portion A at $b$, and have under them each a fixed depending straight rack $b'$, rigidly attached to its part of the leg portion at $b^2$ $b^2$, held by splines $b^3$ in lateral notches in the forked end of a lever or pawl $a^5$, and catching upon or taken into by the edge of the notch of this lever or pawl, which is pivoted to the seat portion at $a^6$. A spring holds the notch of the pawl in engagement with the rack.

To the lower ends of the parts of the leg portion B are attached extensible foot-rests B', which may be folded back into depressions in the upper faces of these parts when not required for use, and so leave the upper surfaces of these parts even.

The back C is pivoted upon the frame D at $c$ in such manner as to render it capable of being raised to a vertical position or of being lowered to a horizontal position or of being moved to any position intermediate between the two, and fixed to the rear of the back is a rod $c'$, and upon this rod, free to slide thereon, is a sleeve $c^2$, provided with lugs $c^3$, projecting rearward, pivoted in which at its upper end and at its lower end in a hanger $d'$ from the frame D is a rod $c^4$. The sleeve may be fixed upon the rod at any desired position by means of a set-screw $c^5$, which passes through a female screw in the sleeve and may be made to bear against the rod. At the rear of the back and in suitable position is provided an extensible rest $c'$ to support the arm of a patient. The rest is adapted to project upon either side of the back of the chair, and may be fixed at any desired extension. The back may also be provided with gutters.

The frame D is pivoted upon the standard of the pedestal E by pins passing through lugs $l$ of the frame and into eyes $e$ of the standard or upon attachments thereto, the extent of movement backward of the frame being restrained by the hanger $d'$ coming into contact with the pedestal, or by horns $e'$ on the standard E$^4$, the upper surfaces of which incline first downward and then sharply upward, forming a hollow or depression and leaving upwardly-projecting ends or tips, which pass through slots $d^3$ in the frame D, and the extent of forward movement is controlled by flattened under surfaces of the frame immediately in advance of the slots $d^3$, striking against the fore part of the upper surfaces of the horns. This construction enables the seat portion and the back when both, for example, have been set in a horizontal position, forming a bed or table to be tilted quickly to be able to lower the head of a patient, as in case of syncope or fainting. Normally the frame will not be tilted, but its weight and that of the parts which it supports may be so adjusted as to retain it in its upward position, and additionally, to insure its retention at the upward position, but also to be able to hold it in its tilted or downward position, there may be a spring-rod or equivalent device—such as a set-screw or screw-rod $d^4$—having a hand-wheel or the like to operate it, is provided, the set-screw passing through one side of the frame laterally, and the inner end being made to bear against the tip of one of the horns. The horn with which the set-screw or screw-rod comes in contact has at the extent of movement downward or tilt, as well as at the extent of movement upward of the frame, a slight depression $e^2$, into which the end of the set-screw or screw-rod may be turned more decidedly to hold the frame at either position. There may of course be any number of these depressions in proper situation to retain the frame at any position on the horn, or the frame may be retained suitably at an end or at an intermediate position without them. The hand-wheel is to be located outside and at the side of the frame for convenience of the operator and for capability of instant adjustment of the frame and the chair or table which it supports.

The means above described, and hereinafter claimed, are carefully to be distinguished from any structure—such as a bed—upon a pivoted supporting-frame capable of being tilted, wherein the supporting-frame is to be held in a tilted position at either side of the pivot by retaining devices at or toward the ends, the distinguishing feature in this respect of my chair capable of presenting an operating-table being that the part to present the operating-table is pivoted upon a central standard carried by the chair-base, and the means for fixing the part in any desired position are at and engaging with the central standard, thus presenting the most immediate facilities for employing the table for the functions above set forth. The operator, standing at one side of the table—say at the left side—should it be necessary instantly to tilt the table has only little more than, with his disengaged hand, to touch the table-fixing means to release the table, and if necessary, slightly bearing upon the table to tilt it, only to operate the means again or to allow them to operate to hold the table in a given position.

Hinged to the frame D at $d^5$ are the swinging arms $d$, having slots $d^6$ in their outer ends, cross-bars $d^7$, provided with lugs $d^2$ and with arc-shaped segments $d^8$, which project inward and pass through horizontal slots $d^9$ in the rear rails of the frame. These arms $d$ form the supports for the seat portion of the chair, the same being pivoted thereto, as already described, and it will be clear that it is by the swinging of these arms that the lateral motion is given to the seat and leg portions of the chair. To fix either part of the seat and leg portions at any position desired in their lateral movement or firmly to hold the parts together, cams $d^{10}$ are provided underneath and bearing against the segments, which cams have suitable handles, and, being rotated thereby, may be pressed upward against either or both segments, and thus firmly bind either or both of them against the upper margin of the slot or slots $d^9$.

Hung upon the frame D, as by hooks $d^{11}$, are cold and hot water receptacles or tanks D', the tank intended for hot water having arrangements for a lamp beneath it or other suitable heating device. Both tanks are connected by pipes with a three-way cock $D^2$. The small pipe $d^{12}$, which passes from the cold-water tank, enters the large pipe $d^{13}$, and, passing throughout the whole length of this pipe, opens at the three-way cock, as seen in the detail view of the cock in Fig. 11. The small pipe $d^{14}$, which passes from the hot-water tank, does not pass throughout the whole length of the large pipe $d^{13}$, but opens into the lower end thereof at $d^{15}$. The purpose of the tanks is to supply either cold or hot water, as may be desired, constantly for use during a surgical operation; and the object of the particular construction of pipes and cock, particularly of running the small cold-water pipe through the large pipe, is to temper water coming either from the cold or hot water tank, not to allow either extremely hot or extremely cold water to be thrown from the nozzle, while by turning the cock toward the cold or toward the hot water either one will soon change the temperature in the whole pipe, so that any temperature from quite hot to quite cold water may be had in a few moments. Readily to draw water through the three-way cock a syringe-bulb $D^3$, with appropriate jet-nozzle, is supplied. This bulb is applied to the three-way cock, as shown, and in a manner that will be apparent and readily understood.

The pedestal consists of the hollow column E', which is attached to and rests upon the spread legs $E^2$, provided with suitable rollers, as described farther on. Upon the hollow column E' is a capped sleeve $E^3$, which fits over and rests upon its top, but is free to slide up and down and rotate upon the column. In the top of the sleeve is a square or other suitably-shaped mortise, into which is set the standard $E^4$. This standard has an enlargement at its lower end, which prevents it from being entirely withdrawn from the sleeve, and when set in position it not only fits within the sleeve, but is set down within the hollow column E′, which the sleeve surrounds, serving as a guide for the standard within the hollow column. The standard is free to move up and down in the sleeve and in the hollow column; but as it is not free to turn in the sleeve, owing to the shape of the mortise in the top of the sleeve through which it extends into the sleeve and into the column, when attempt is made to rotate it it rotates the sleeve upon the hollow column. To the upper end of this standard are secured the horns $e′$, and upon these, as already described, is pivoted the frame bearing the upper parts of the chair. It will be clear that raising or lowering the standard in the sleeve and hollow column will raise the upper structure of the chair, while the capacity for rotation of the sleeve upon the hollow standard permits the upper part of the chair to be swung around. To restrain the rotation of the sleeve upon the hollow column, there may be provided a set-screw or other suitable device to bind against the column. I prefer to employ for this purpose a cam-lever, as shown in Fig. 4. The sleeve may be raised entirely off the hollow column, leaving this and the spread-legs together and carrying with it the standard. The standard is raised and lowered in the sleeve and hollow column by means of a band attached to the lower part of the standard, and passing upward within the sleeve and over the shaft of a crank, when turning, the crank will wind or unwind the band, and thus raise or lower the standard, or by a gear meshing with a rack on the standard, the gear-wheel being on the crank-shaft. The crank-shaft $e^3$ passes through bearings $e^4$ on the cap of the sleeve $E^3$, one of which bearings has integral with one side a ratchet $e^5$, or has a ratchet-face. To the lower end of the standard $E^4$ is attached a metal band $e^6$, which passes up along the side of the standard and is wound upon the crank-shaft $e^3$. By turning the crank or winch $e^7$ the standard is elevated or lowered. The crank-shaft $e^3$ is a hollow shaft with a perforation through it, which when the shaft is in position will be near that bearing on the sleeve which has the ratchet-face, and within it, near its outer end, an inwardly-projecting flange $e^8$. Into this hollow shaft is set a rod $e^9$, having a collar $e^{10}$, which rod is free to slide in the hollow shaft, and upon this inner rod, with one end abutting against the inward-projecting flange of the hollow shaft and the other end abutting against the collar of the inner rod, is a coiled spring $e^{11}$, surrounding the inner rod. The inner rod has a perforation through it, which registers with the perforation in the hollow shaft, only that the perforation through the rod is of less length than that through the hollow shaft. Into the perforation in the rod, in such manner as to project laterally beyond the hollow shaft and to bear against the ratchet-face of the bearing, is inserted a key or plug $e^{12}$—that is to say, when the rod is in its normal position, with the coiled-spring $e^{11}$ surrounding it, bearing at one end against the inwardly-projecting flange $e^8$, and the other pushing against the collar $e^{10}$ of the rod, the key will be pressed against the ratchet-face of the bearing, and so prevent the crank-shaft from turning in one direction, the direction in which the standard through the band pulling upon the crank-shaft would tend to turn it by the gravity of the standard and the superincumbent weight of the parts which it supports. The perforation through the hollow shaft being of greater length than that through the rod, the rod is free to be moved lengthwise in the hollow shaft, and thus to withdraw the key from contact with the ratchet-face. To facilitate this, the rod projects beyond the end of the sleeve, where it is attached to a lever $e^{13}$, which is fulcrumed at $e^{14}$ on the winch. It will be obvious that in turning the crank in one direction—that by which the standard and with it the upper portion of the chair is to be raised, the key will slip over the ratchet-face, and that upon ceasing to turn the shaft it will be held in position against the ratchet-face by the key, but that when it is desired to let the standard and with it the upper portion of the chair down it will only be necessary to withdraw the key from the ratchet-face by pressing upon the lower end of the lever, and then allowing the standard gradually to sink, restraining it against sudden falling by restraining any sudden or rapid revolution of the winch.

$E^5$ is a basin or can attached to the top of the sleeve $E^3$ by means of hooks passing over the bearings $e^4$, making it readily removable and replaceable. The object of the basin is to receive the slops from surgical operations.

$E^6$ is an apron to be placed under the body with its lower end terminating in the slop-basin. In addition to this, or without this, there may be drain-tubes $e^{15}$ leading from gutters in the seat, leg, and back portions of the chair to the slop-basin.

As before mentioned, the hollow column is supported on spread legs.

It is essential that a heavy body like a surgical chair, which has occasionally to be shifted from one place in an apartment to another or from one apartment to another, should be readily movable; but it is equally essential that the chair should be capable of being fixed in any position. To these ends the chair is supplied with rollers $e^{16}$, and in order readily to fix the chair means are supplied whereby the rollers may be removed from contact with the floor or other surface upon which the chair rests, so that it will then be supported upon feet at the ends of the legs or upon the ends of the legs themselves. One means of raising the rollers from or allowing them to rest upon the surface which supports the chair is shown in Figs. 1, 2, 3, 4, 5, and 6 of the drawings, while another means is shown in Fig. 14 thereof. In Figs. 1 to 6 the means for accomplishing the result are shown as consisting in small pivoted feet $e^{17}$. These feet are in the form of hoods or curved concavo-convex pieces with their concave sides toward the chair-legs, and are pivoted near their lower ends to the lower ends of the chair-legs. It will be obvious that when the upper parts lie against the chair-legs, the points or toes will be extended, and so will lift the rollers from the surface, but that when the upper parts are pulled away from the chair-legs the points or toes will pass inward under the chair-legs or be retracted, allowing the rollers to come down upon the supporting-surface. Of course it will be clear that the feet are only made concavo-convex to fit rounded chair-legs, and that if the chair-legs be of any other shape these feet may be made of suitable shape to conform to them.

In Fig. 14 the means for accomplishing the result are shown as consisting, principally, in hinging or pivoting the rollers themselves to the chair-legs and pulling them into or pushing them out of contact with the surface upon which the chair is supported. When they are pushed out of contact, the chair resting upon the surface by the ends of its legs, the rollers are held in small frames $e^{18}$, which are hinged at one end $e^{19}$ to the chair-legs, so that the rollers are underneath the chair-legs and within their ends. At the other end they have each a perforation $e^{20}$ taken into by the hooked ends of rods $e^{21}$. The other ends of these rods pass through guides $e^{22}$, which descend from the chair-legs, and are inserted into slots $e^{23}$ in a disk $E^6$, which is attached to the lower end of the hollow column in such manner as to be free to oscillate thereon. The slots $e^{23}$ are tangential to the curved surface of the hollow column upon which the disk oscillates. The disk has projecting from it laterally a pin, upon which is a roller $e^{24}$, and to the column is hinged a lever $e^{25}$, which has projecting from its side toward the roller, a piece of wood, metal, or the like, with its edge next the roller forming an inclined plane $e^{26}$ with the inclination rearward. Now it will be clear that when the lever is depressed the inclined plane pushing the roller will rotate the disk, and that as this is turned, inasmuch as the rods cannot move laterally, their ends will be drawn to the opposite ends of the slots or toward the center of the disk, thereby pulling upon the rods, pulling upon the rollers, and drawing them against the supporting-surface of the chair, when the chair will then rest upon the rollers. It will be equally clear that when the lever is raised the rollers will be pushed away from the surface upon which the chair is supported, and that the chair will then rest upon the ends of its legs. In some instances the guides may be dispensed with and the lateral pull of the rods be relied upon to draw the rollers into position for supporting the chair.

The head-rest F consists of a pad-frame F′, fastened to both ends of a bent rod $F^2$, as shown in Fig. 16. The clamp $F^3$, composed of two sections, as shown in Fig. 17, takes onto the bent rod, and is capable of being tightened or loosened upon the same by means of a screw $f$, having a shoulder $f'$ fitting against one side of the clamp and a screw-thread taking into the other. The shoulder portion of the screw is square or of other suitable configuration to furnish a hold for a wrench, and just outside of the shoulder the screw is rounded, while outside of the rounded portion again there is a head $f^2$. A wrench $f^3$ of suitable configuration to fit upon the shoulder and turn the screw hangs from the outer portion of the screw. When not in use, the wrench may be slipped from the shoulder upon the round portion between the shoulder and the head, the head keeping it from entire separation from the screw. This serves as convenient means for carrying a wrench, having it constantly at hand for use. Instead of by the screw, the clamp may be operated by a cam-headed lever, as shown in Fig. 19. The clamp $F^3$ has a shank $f^4$, and this shank extends backward through and slides in a block $F^4$, which in turn slides upon an upward extension of the rod $c'$, which is at the back of the chair. The block may be fixed at any position on the rod by means of a set-screw or a cam-headed lever $f^5$, and the shank may be set at any position in the block by means of a set-screw or cam-headed lever $f^6$. By loosening the clamp the head-rest may be slipped or turned laterally or vertically, thus giving the head any position that may be deemed most advantageous, and the capability of adjustment of the shank in the block and the block upon the rod enables the head-rest to be pushed forward or backward and be raised or lowered, as may be desired. Upon the outer ends of the bent rod $F^2$ are disks $f^7$ free to rotate, and at points on the circumferences of these disks are hinged at $f^8$ levers $f^9$. These levers are actuated by screws $f^{10}$, which pass through threaded openings in the lower ends of the levers $f^9$, freely through slots in the disks $f^7$, and at their points are set into countersinks or depressions $f^{11}$ in the rounded ends of the bent rod. As the screws take into the screw-threaded openings in the ends of the levers and bear against the outer ends of the bent rod, and the levers are hinged at right angles to the motion of the screw, as the screws are turned in or out, the levers will be moved in or out. As before said, the levers are hinged at points on the circumference of the disks, and as these disks are free to rotate upon the ends of the bent rod, the levers might constantly be dropping or turning laterally; but the ends of the screws passing through the slots in the disks and their ends taking into the countersinks or depressions $f^{11}$ in the ends of the bent rod, any unexpected turning laterally is prevented when there is due pressure outward upon the other end of the levers. Upon the outer ends of the levers are attached the pads $f^{12}$. These pads are thrown against or away from the head by the screws $f^{10}$, and by the levers, the screws, and the pads the head may be firmly clamped in the head-rest. As already shown, when the levers are held against swinging on their pivots $f^7$, as by the head of a patient against the pads at one end and the screws at the other, the pads will be kept from sliding up or down upon the head by the ends of the screws being sunk in the depressions $f^{11}$. In the ends of the levers $f^9$ there may be slots $f^{13}$ to permit adjustment of the pads forward or back, the pad being provided with a set-screw passing through the slot for the purpose of holding it in any position desired.

In addition to the adjustments described the pad-frame may be rocked forward or backward on the bent rod on pivots $f^{14}$, the extent of its movement being limited by an arc-shaped slot $f^{15}$ in a projection $f^{16}$ from the bent rod, a set-screw passing through this arc-shaped slot to fix the pad-frame when the desired position is attained. The projection may be spring-seated, as shown in Fig. 19. The pad-frame is suitably padded, and the pads $f^{12}$ are covered with rubber and are filled with sand, shot, or other granular substance, the object being to provide a pad which will present at once smooth, soft, and at once adhesive surface for the skin, and will also have a movable filling, so that it will conform to any inequalities of the head or face, while when pressure is applied it will not be readily movable, as it would if filled with air.

The manner in which I render my chair either fixed or movable is to be distinguished from those devices in which the roller is merely pulled down below the foot, my device being distinguishable from such by the specific means of conversion, as shown and described.

Having thus fully described my invention, what I claim as new, and desire to secure by Letters Patent, is—

1. An operating-chair having a seat portion and a back, the seat portion being divided into two parts, each part moving horizontally upon a pivot behind the back of the chair, forming a split seat, substantially as set forth.

2. An operating-chair having a seat portion, a leg portion, and a pivoted back, the seat portion being divided into two parts, each separately movable both horizontally and vertically, horizontally upon a pivot behind the back of the chair, and having pivoted to it in such manner as to be vertically movable upon it one-half of the leg portion, each part of the seat portion when moved laterally carrying with it in this movement its part of the leg portion and being capable of fixture in any position to which it is laterally moved, each part of the seat portion being also capable of fixture in any position to which it may be moved vertically, and the part of the leg portion appertaining to each part of the seat portion independently movable upon such part and capable of fixture itself in any position to which it may have been moved vertically, substantially as described.

3. The combination, with the side rail of the seat portion, of an adjustable foot-support consisting of a sandal and a shank, the shank having a socket at its lower end open at one side, whereby it may be slipped over the end of the side rail, the socket acting to clamp the foot-support on the rail upon pressure being exerted against the sandal, substantially as described.

4. In combination with the seat portion of a chair, a leg portion divided into two parts, each part pivoted to a separate part of the seat portion in such manner as to be vertically movable thereon, with capability of fixture in any position to which it may be moved vertically, also capable of movement laterally with the seat portion and having depressions in the upper faces of their lower ends, and provided with pivoted and vertically-movable foot-rests, whereby the foot-rests may be folded back into the depressions in the leg portion and leave the upper surfaces thereof even, substantially as described.

5. In combination with the leg portion of an operating-chair having a depression in the upper face of its lower part, a pivoted and vertically-movable foot-rest capable of being folded back into the depression when not in use to leave the upper surfaces even, substantially as described.

6. An operating-table upon a supporting-frame pivoted upon a central standard in a chair-base and means in the frame engaging with said standard for fixing the table in any desired position, substantially as and for the purpose set forth.

7. An operating-table upon a supporting-frame pivoted upon a central standard and means in the frame for engaging with the standard for fixing the table in the desired position, said means consisting of a rod projecting from the side of the frame for convenience of manipulation and at the other end engaging with the said standard, substantially as described.

8. The combination, with an operating-table supporting frame or platform provided with openings, of a central standard upon which the platform is pivoted, said standard having lugs or horns, one of which is provided with recesses or sockets, the lugs or horns being adapted to enter the openings in the platform, and the recesses or sockets being to receive the end of the rod constituting the means for fixing the table in the desired position, substantially as described.

9. In an operating-chair, in combination with the seat portion thereof, capable of separation laterally and placed upon a support sustaining a receptacle, an apron leading from the seat portion to the receptacle, substantially as and for the purpose specified.

10. An operating-chair provided with gutters at the sides, as and for the purpose set forth.

11. The combination, with the seat and back portion of an operating-chair provided with gutters at the sides, of tubes leading from the gutters, substantially as described.

12. The combination, with an operating-chair, of receptacles for hot and cold water, attached to the supporting-frame, and forcing devices connected with the said receptacles for supplying hot or cold water, or both, in an operation upon a patient, substantially as set forth.

13. The combination of the supporting-frame, the standard, the sleeve, and the tube or hollow column of a diameter little greater than that of the standard or an enlargement at the lower end thereof, and the sleeve being on the outside of the tube or hollow column, whereby the tube or hollow column itself acts as a guide and stay for the standard, the supporting-frame being sustained by the standard, and the standard being movable up and down in the sleeve and in the tube or hollow column within the sleeve though restrained against rotation in the sleeve, but the sleeve rotating upon the tube, whereby the supporting-frame carrying the upper parts of the chair may have either rotary or vertical motion, or both, substantially as set forth.

14. The combination of the supporting-frame, the standard, the sleeve, and the tube or hollow column of a diameter but little greater than that of the standard or an enlargement thereof, and the sleeve being on the outside of the tube or hollow column, whereby the tube or hollow column acts as a guide and stay for the standard, the supporting-frame being sustained by the standard, and the standard being movable up and down in the sleeve and in the tube or hollow column within the sleeve though restrained against rotation in the sleeve, but the sleeve rotating upon the tube, whereby the supporting-frame carrying the upper parts of the chair may have either rotary or vertical motion, or both, means for holding the standard in any position to which it may have been raised, and means for holding the sleeve in any position to which it may have been turned, substantially as described.

15. The combination, with the hollow column, of a standard having an enlargement at its lower end and capable of movement vertically therein, the shaft, and a band or cable attached directly to the enlargement at the lower end of the standard and at one side of the standard only, said band or cable connecting the shaft with the standard, whereby upon turning the shaft the standard may be raised or lowered in the sleeve and hollow column by draft on one side of the standard without racking the same, the standard or the enlargement thereof serving as a stay or guide within the tube, all substantially as described.

16. The combination of the standard, the sleeve having bearings one of which has a ratchet-face, the hollow shaft turning in the bearings and provided with a perforation, the central spring-rod also provided with a perforation and having in it a key, the ends of which project beyond the hollow shaft and are pressed against the ratchet-face by the spring, means for connecting the crank-shaft with the standard, a winch on the hollow crank-shaft, and a lever on the end of the spring-rod fulcrumed upon the winch, substantially as and for the purpose described.

17. The combination, with the leg of a chair, of a roller-frame $e^{19}$, carrying a roller, a rod $e^{21}$, passing through a hanger having an opening $e^{22}$, and a disk $E^6$ upon an upright portion of the lower part of the chair capable of oscillation and provided with slots $e^{23}$, substantially as and for the purpose described.

18. The combination, with the leg of a chair, of a roller-frame $e^{19}$, carrying a roller, a rod $e^{21}$, passing through a hanger having an opening $e^{22}$, a disk $E^6$ upon an upright portion of the lower part of the chair capable of oscillation and provided with slots $e^{23}$, the disk being provided with a roller $e^{24}$, and a lever $e^{25}$, having a projection with a cam-face $e^{26}$, bearing against a roller, substantially as and for the purpose described.

19. The clamping device having the two jaws, as shown, held together by a screw having a shoulder next to the jaw of the clamp, and a rod outside of the shoulder, there being a rounded portion between the shoulder and the head carrying a wrench which is prevented from separation from the screw by the head, substantially as and for the purpose described.

20. The combination, with the enlarged ends of the bent rod provided with countersinks, of the disks $f^7$, provided with openings and having hinged to them the levers $f^9$, these levers having set-screws passing through screw-openings in their lower ends through the openings in the disks and against the enlarged ends of the bent rod, substantially as and for the purpose described.

21. The pads $f^{12}$, having a rubber or other suitable surface and filled with granular substances, substantially as and for the purpose described.

22. In combination with the supports $d$, pivoted at $d^5$ and having segmental pieces $d^8$, the rear rail of the frame provided with slots through which the segmental pieces pass, and cams $d^{10}$ to bind the segmental pieces $d^8$ against the upper margins of the slots, substantially as described.

In testimony whereof I affix my signature in presence of two witnesses.

HORACE R. ALLEN.

Witnesses:
SAML. A. MINTURN,
WILBER N. COX.